(12) United States Patent
Conner et al.

(10) Patent No.: US 6,577,931 B2
(45) Date of Patent: Jun. 10, 2003

(54) DELTA HEIGHT BIAS AND TERRAIN FLOOR GENERATORS FOR A GROUND PROXIMITY WARNING SYSTEM

(75) Inventors: Kevin J Conner, Kent, WA (US); Yasuo Ishihara, Kirkland, WA (US); Steve C. Johnson, Issaquah, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/917,374

(22) Filed: Jul. 27, 2001

(65) Prior Publication Data

US 2002/0128756 A1 Sep. 12, 2002

Related U.S. Application Data

(60) Provisional application No. 60/263,862, filed on Jan. 23, 2001.

(51) Int. Cl.[7] .............................. G08G 5/04; G06F 17/00
(52) U.S. Cl. .............................. 701/14; 701/9; 701/120; 701/301; 340/961; 340/970; 244/185; 342/29
(58) Field of Search ............................. 701/14, 9, 120, 701/207, 208, 209, 213, 301; 340/970, 945, 963, 964, 961; 244/180, 181, 185; 342/358, 29, 30, 31, 38

(56) References Cited

U.S. PATENT DOCUMENTS

| | | | | |
|---|---|---|---|---|
| 6,094,607 A | * | 7/2000 | Diesel | 701/4 |
| 6,216,064 B1 | * | 4/2001 | Johnson et al. | 701/4 |
| 6,292,721 B1 | * | 9/2001 | Conner et al. | 701/9 |
| 2001/0047230 A1 | * | 11/2001 | Gremmert et al. | 701/4 |

* cited by examiner

Primary Examiner—Thomas G. Black
Assistant Examiner—Tuan C To
(74) Attorney, Agent, or Firm—Honeywell International Inc.

(57) ABSTRACT

A terrain avoidance system, method and computer program product for reducing nuisance alarms. The system includes a geometric altitude component, first and second vertical safety margin generators, and an alert component.

22 Claims, 6 Drawing Sheets

DELTA HEIGHT BIAS AND TERRAIN FLOOR GENERATORS FOR A GROUND PROXIMITY WARNING SYSTEM

PRIORITY CLAIM

This application claims the benefit of U.S. Provisional Application Ser. No. 60/263,862, filed in the name of Conner et al. on Jan. 23, 2001, the complete disclosure of which is incorporated herein by reference.

BACKGROUND OF THE INVENTION

An enhanced ground proximity warning system (EGPWS) monitors a threat in front of an aircraft. In cases where the aircraft experiences an altitude error, the aircraft could crash into terrain without any EGPWS generated alerts. This problem arises especially when the EGPWS is installed in aircraft that operates very close to the ground, such as helicopters. Therefore, there exists a need for a system that would provide consistent and reliable EGPWS alerts in such an environment, thereby enhancing aircraft safety.

SUMMARY OF THE INVENTION

An improved aircraft terrain avoidance system, method and computer program product that reduces nuisance alarms is provided. The system includes a geometric altitude component, first and second vertical safety margin generators, and an alert component. The geometric altitude component generates a geometric altitude vertical error value based on barometric altitude and a positioning system value, such as a global positioning system generated value. The first vertical safety margin generator generates a first vertical safety margin value based on the generated vertical error value and safety margin limits. The second vertical safety margin generator generates a second vertical safety margin value based on the generated first vertical safety margin value, aircraft groundspeed, and aircraft distance to a selected runway. The alert component outputs an alert signal to the flight crew if it determines an alert condition exists based on the generated vertical safety margin.

In accordance with further aspects of the invention, the second vertical safety margin generator includes a groundspeed-based generator, a distance-from-runway-based generator, and a selector. The groundspeed-based generator generates a groundspeed safety margin value based on the first safety margin value, aircraft speed, and a predefined hover and approach speed. The distance-from-runway-based generator generates a distance-from-runway safety margin value based on the first safety margin value, a predefined runway distance bias, and aircraft distance to a selected runway. The selector makes the lesser of the groundspeed safety margin value and distance-from-runway safety margin value the second vertical safety margin value.

In accordance with other aspects of the invention, the system further includes a terrain floor generator that generates a terrain floor height value based on aircraft groundspeed, a predefined hover speed and approach speed, and a runway distance based terrain floor height value. The alert component further outputs an alert signal to the flight crew if an alert condition exists based on the generated terrain floor height value.

As will be readily appreciated from the foregoing summary, the invention provides a ground avoidance system that takes into consideration an altitude error value, and an aircraft's speed and position relative to an airport when determining how to evaluate threats.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

A preferred embodiment of the present invention is an Enhanced Ground Proximity Warning System (EGPWS) that provides a vertical safety margin (delta height (DH) bias) that takes into consideration geometric altitude error (vertical figure of merit (VFOM)), see FIGS. 1–5. Geometric altitude is an aircraft altitude value that has taken into consideration barometric altitude and a global positioning system (GPS) component. VFOM is a vertical error component of geometric altitude. Geometric altitude and VFOM are described by example in U.S. Pat. No. 6,216,064, which is hereby incorporated by reference. The result of this embodiment is an EGPWS that more accurately estimates aircraft position. With a more accurate measurement, the terrain floor is reduced in order to reduce the occurrence of nuisance warnings, see FIGS. 1 and 6.

Figure 1:
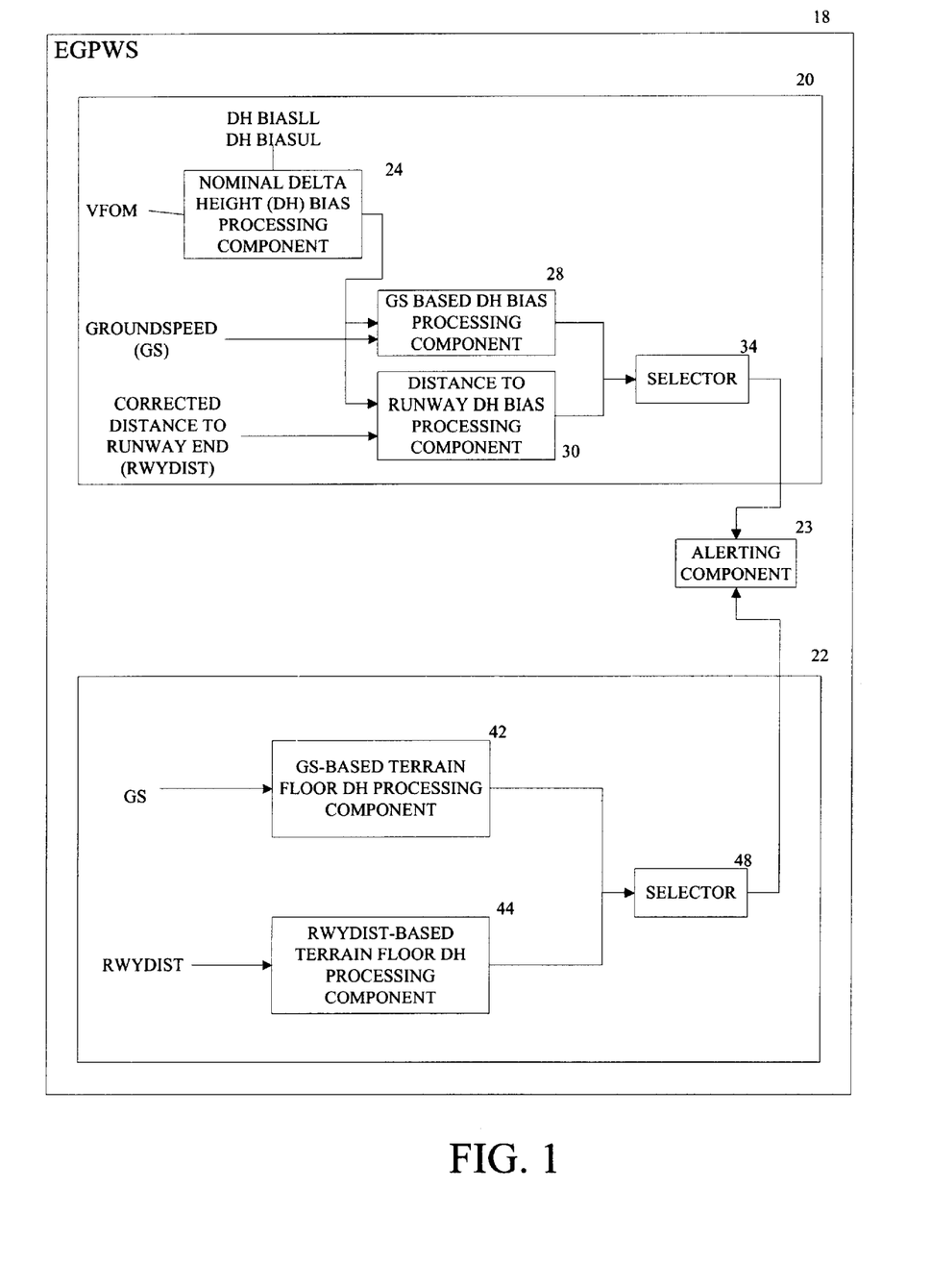
FIG. 1 is a black diagram illustrating components of the present invention.

FIG. 1 illustrates an example EGPWS 18 that includes a DH component 20 for providing a DH bias based on VFOM, aircraft groundspeed (GS) and aircraft distance to selected runway, a terrain floor delta height (TFDH) component 22 for providing a TFDH value based on groundspeed and a previously determined TFDH boundary, and an alerting component 23. The DH component 20 includes a nominal DH bias processing component 24, a GS-based DH bias processing component 28, an aircraft-distance-to-selected-runway-based (distance to runway) DH bias processing component 30, and a selector 34. The nominal DH bias processing component 24 generates a nominal DH bias based on an EGPWS generated DH bias upper and lower limits and VFOM. The GS-based DH bias processing component 28 generates a DH bias based on the GS and the generated nominal DH bias. The distance to runway processing component 30 generates a DH bias based on the corrected aircraft distance to selected runway end and the nominal DH bias. The selector 34 selects the lesser of the DH biases generated from the components 28 and 30. The selected DH bias is sent to the alerting component 23. These processes are described in more detail below in FIGS. 3–6.

Figure 7:
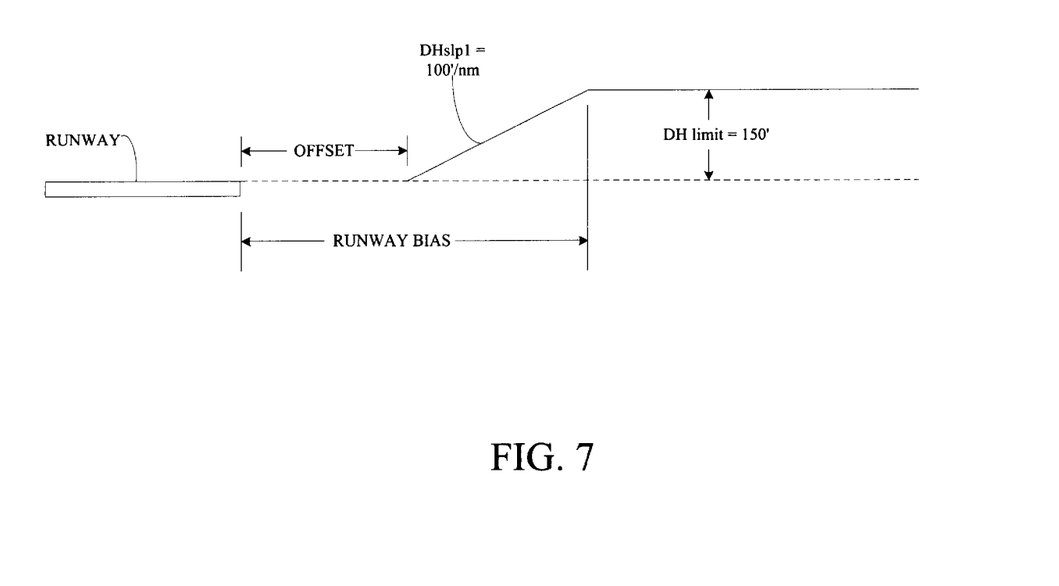
FIG. 7 is a graph of terrain floor delta height as a function of distance from a runway.

Also shown in FIG. 1 are the contents of the TFDH component 22. The TFDH component 22 generates a TFDH value that takes into consideration aircraft groundspeed and a previously determined TFDH boundary. The TFDH component 22 includes a GS-based TFDH processing component 42, a runway distance-based TFDH processing component 44, and a selector 48. The GS-based TFDH processing component 42 generates a TFDH value based on a TFDH vs. GS curve up to a predetermined TFDH limit value. The runway distance-based TFDH processing component 44 generates a TFDH value based on a TFDH vs. distance to runway curve (i.e. TFDH boundary). The TFDH vs. distance to runway curve is previously stored EGPWS memory and is shown in FIG. 7 below. The selector 48 chooses the lesser of the TFDH values outputted from the components 42 and 44.

The component 20 and 22 send the chosen DH bias value and TFDH value, respectively, to the alert component 23 for analyzing the present flight parameters and determining if an alerting condition exists.

Figure 2:
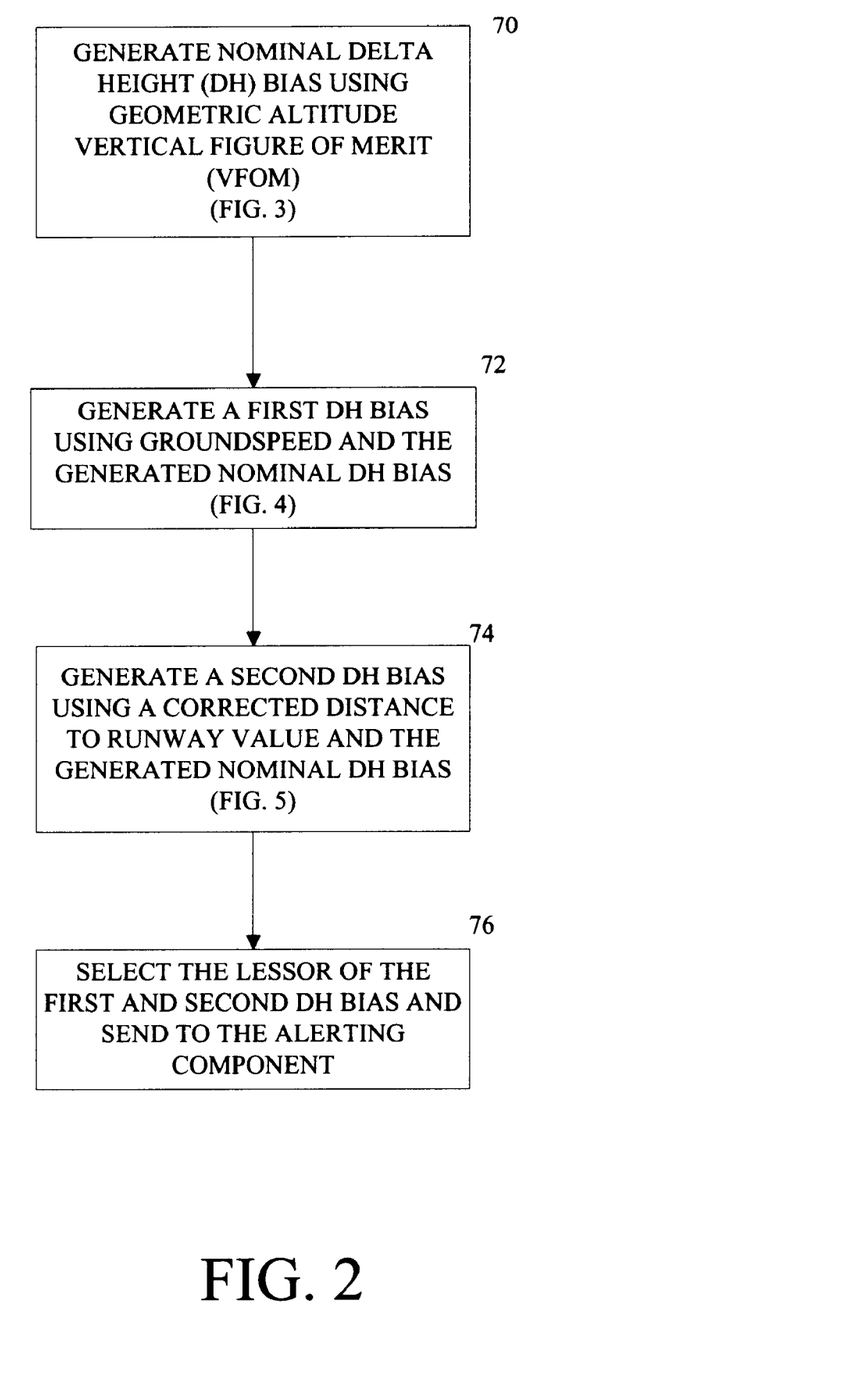
FIGS. 2–5 are flow diagrams of an embodiment of the present invention showing a process for generating an improved delta height bias component.

FIG. 2 illustrates a preferred process performed by the component 20 of the EGPWS 18. First, at block 70, the process generates a nominal DH bias based on geometric altitude and VFOM, see FIG. 3 for more detail. Next, at block 72, the process determines a first DH bias using GS and the generated nominal DH bias, see FIG. 4 for more detail. At block 74, the process generates a second DH bias based on a corrected distance to runway end value and the generated nominal DH bias, see FIG. 5 for more detail. The process selects the lesser of the first and second DH bias and sends it to the alerting component 23, see block 76.

Figure 3:
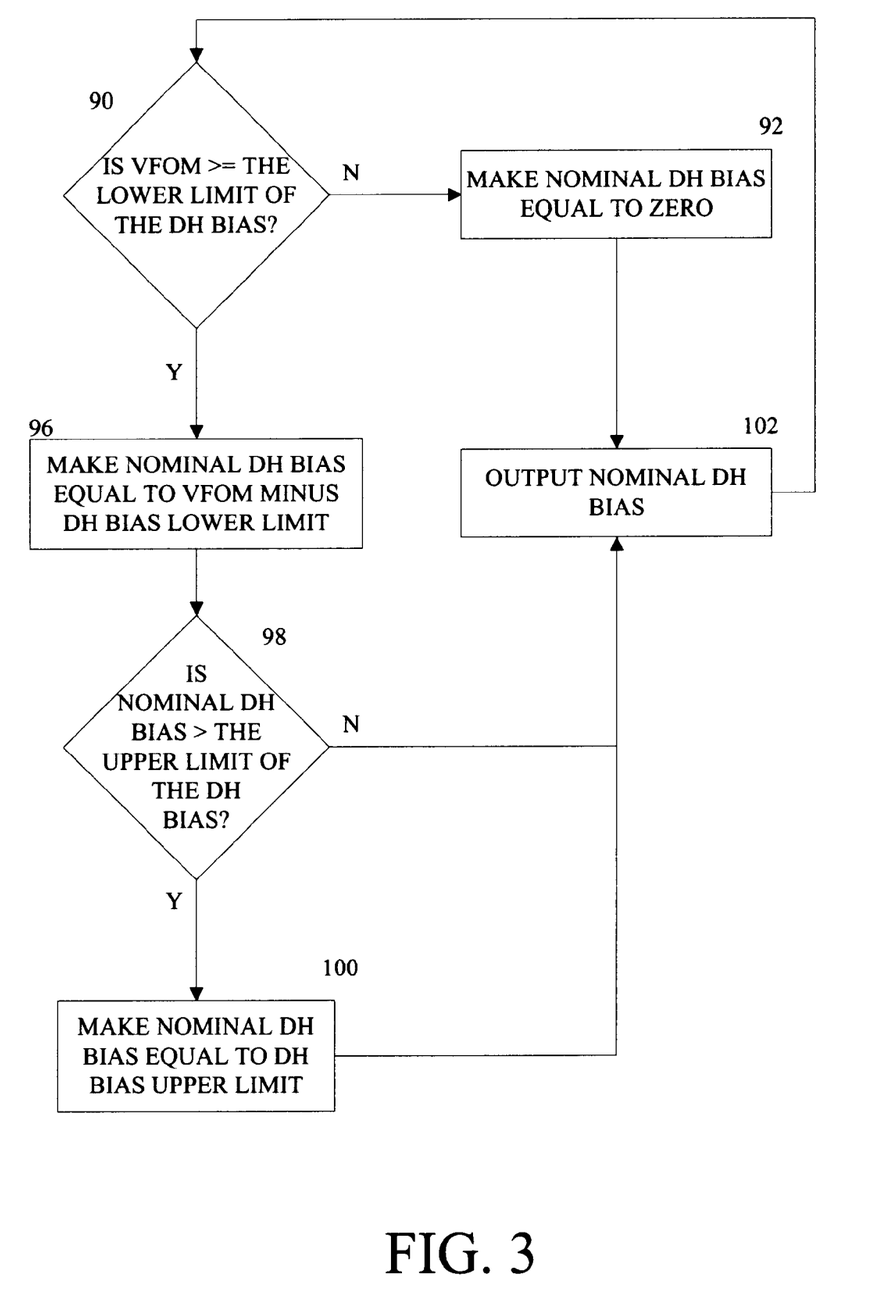

FIG. 3 illustrates the process from block 70 of FIG. 2. First, at decision block 90, the process determines whether VFOM is greater than or equal to a DH bias lower limit. The DH bias lower limit is preferably zero. If VFOM is not greater than or equal to the DH bias lower limit, a nominal DH bias is made equal to zero, see block 92. If VFOM is greater than or equal to the DH bias lower limit, a nominal DH bias is set equal to VFOM minus the DH bias lower limit, see block 96, and a decision shown in decision block 98 is performed. At decision block 98, the process determines whether the nominal DH bias from block 96 is greater than a DH bias upper limit. If the nominal DH bias is greater than the DH bias upper limit, the nominal DH bias is made equal to the DH bias upper limit, see block 100. If the nominal DH bias is not greater than the DH bias upper limit, the nominal DH bias does not change and the process, at block 102, outputs the nominal DH bias to the alerting component 23 and then returns to decision block 90 as long as the EGPWS 18 and the component 20 remain activated. The DH bias upper limit is preferably very large for allowing the nominal DH bias to be the default DH bias more often than not. After blocks 92 and 100, the process also proceeds to block 102 where the nominal DH bias is outputted. From block 102 the process returns to decision block 90. The DH bias upper and lower limits are preferably predetermined values stored in the EGPWS 18.

Figure 4:
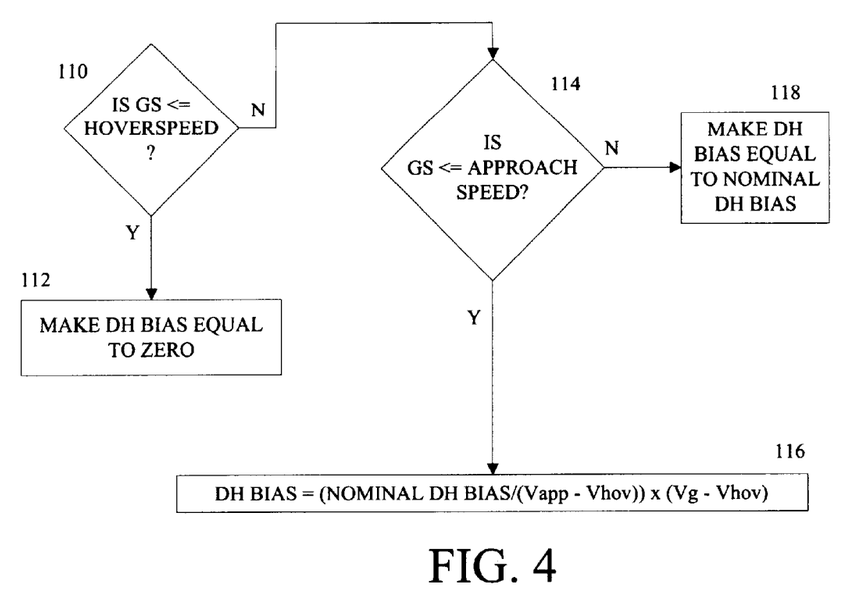

FIG. 4 illustrates the process form block 72 of FIG. 2. First, at decision block 110, the process determines whether the aircraft's GS is less than or equal to a predefined hover speed. The hover speed is a value previously determined based on the flight parameters of the associated aircraft, such as an aircraft that performs vertical or near vertical take-off and landings (VTOL) (e.g., helicopters, Harriers, Ospreys). If the GS is less than or equal to the hover speed, the DH bias is made equal to zero, see block 112. If the GS is not less than or equal to the hover speed, the process determines whether the GS is less than or equal to an approach speed, see decision block 114. If the condition in decision block 114 is true, DH bias is solved as follows in Equation (1).

$$DH \text{ bias} = \frac{\text{nominal } DH \text{ bias}}{V_{App} - V_{Hov}}(V_g - V_{Hov}) \qquad (1)$$

$V_g$=groundspeed
$V_{App}$=approach speed
$V_{Hov}$=hover speed

Otherwise, DH bias is made equal to the nominal DH bias. The approach speed, like the hover speed, is previously determined according to associated aircraft flight parameters.

Figure 5:
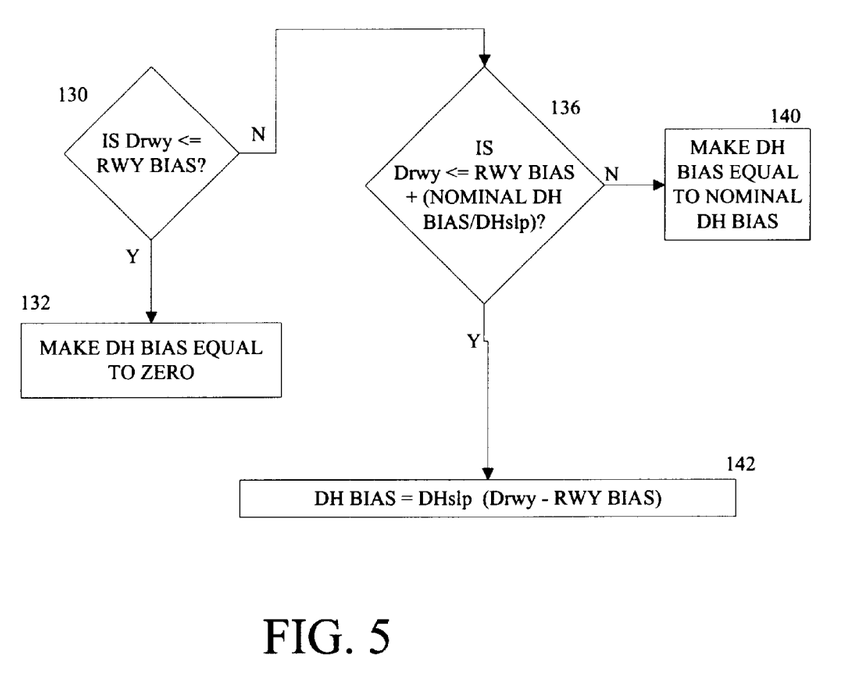

FIG. 5 illustrates the process from block 74 of FIG. 2. First, at decision block 130, the process determines whether the aircrafts distance from a selected runway is less than or equal to a runway bias. FIG. 8 shows that the runway bias is the distance from the runway end where a previously determined TFDH limit is reached. In this example runway bias equals 2.5 nm (offset(1 nm)+1.5 nm (i.e., distance to reach the TFDH limit of 150 ft. at a DH slope of 100 ft/nm). If the check at decision block 130 is true, DH bias is set equal to zero, at block 132, If the check at decision block 130 is false, the process checks whether the condition in Equation (2) is true.

$$Drwy \le nmRwyBias + \frac{\text{nominal } DH \text{ bias}}{DHslp1} \qquad (2)$$

Drwy=aircraft's corrected distance from runway
nmRwy Bias=runway bias
DHslp1=DH slope
If equation (2) is false, the DH bias is made equal to the nominal DH bias, otherwise, equation (3) is applied.

$$DH \text{ } bias=DH \text{ } slp1(Drwy-nmRwyBias) \qquad (3)$$

Figure 6:
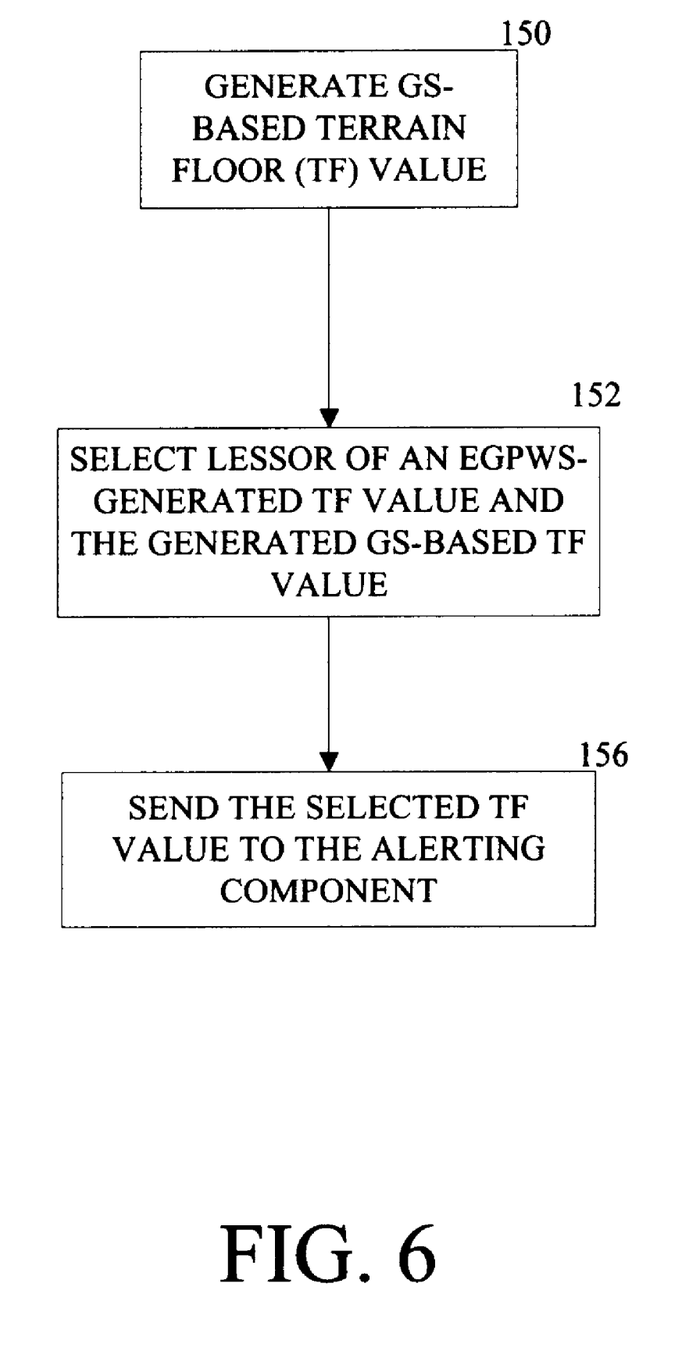
FIG. 6 is a flow diagram for determining a terrain floor delta height boundary.

FIG. 6 illustrates a preferred process performed by the TFDH processing component 22 of the EGPWS 18. First, at block 150, the process generates a GS-based TFDH value. At block 152, the generated process selects the lesser of the GS-based TFDH and an EGPWS generated TFDH. Next, at block 156, the selected TFDH is sent to the alerting component 23 for processing.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for generating a vertical safety margin value for use by a terrain avoidance system in an aircraft, the method comprising:
   generating a altitude vertical error value;
   generating a vertical safety margin value based on the generated vertical error value and safety margin limits;
   determining if an alert condition exists based on the generated vertical safety margin; and
   generating a terrain floor height value based on a aircraft groundspeed, a predefined hover speed and approach speed, and a runway distance based terrain floor height value, wherein determining if an alert condition exists is further based on the generated terrain floor height value.

2. The method of claim 1, wherein the altitude vertical error value is geometric altitude vertical error value that is based on barometric altitude and a positioning system value.

3. A method for generating a vertical safety margin value for use by a terrain avoidance system in an aircraft, the method comprising:
   generating a altitude vertical error value;
   generating a first vertical safety margin value based on the generated vertical error value and safety margin limits;

generating a second vertical safety margin value based on the first vertical safety margin value, aircraft groundspeed, and aircraft distance to a selected runway; and determining if an alert condition exists based on the generated second vertical safety margin value, wherein generating the second vertical safety margin value comprises:

generating a groundspeed safety margin value based on the first safety margin value, aircraft speed, and predefined hover and approach speed;

generating a distance-from-runway safety margin value based on the first safety margin value, a predefined runway distance bias, and aircraft distance to a selected runway; and making the lesser of the groundspeed safety margin value and distance-from-runway safety margin value the second vertical safety margin value.

4. The method of claim 3, wherein generating an altitude vertical error value comprises generating a geometric altitude vertical error value that is based on barometric altitude and a positioning system value.

5. The method of claim 3, further comprising generating a terrain floor height value based on aircraft groundspeed, a predefined hover speed and approach speed, and a runway distance based terrain floor height value, wherein determining if an alert condition exists is further based on the generated terrain floor height value.

6. A terrain avoidance system in an aircraft comprising:

an altitude component configured to generate a altitude vertical error value;

a vertical safety margin generator configured to generate a vertical safety margin value based on the generated vertical error value and safety margin limits;

an alert component configured to determine if an alert condition exists based on the generated vertical safety margin; and a terrain floor generator configured to generate a terrain floor height value based on a aircraft groundspeed, a predefined hover speed and approach speed, and a runway distance based terrain floor height value, wherein the alert component is further configured to determine if an alert condition exists based on the generated terrain floor height value.

7. The system of claim 6, wherein the altitude component is further configured to generate a geometric altitude vertical error value that is based on barometric altitude and a positioning system value.

8. A terrain avoidance system in an aircraft comprising:

an altitude component configured to generate a altitude vertical error value;

a first vertical safety margin generator configured to generate a first vertical safety margin value based on the generated vertical error value and safety margin limits;

a second vertical safety margin generator configured to generate a second vertical safety margin value based on the first vertical safety margin value, aircraft groundspeed, and aircraft distance to a selected runway; and an alert component configured to determine if an alert condition exists based on the generated second vertical safety margin value, wherein the second vertical safety margin generator comprises:

groundspeed-based generator configured to generate a groundspeed safety margin value based on the first safety margin value, aircraft speed, and predefined hover and approach speed;

a distance-from-runway-based generator configured to generate a distance-from-runway safety margin value based on the first safety margin value, a predefined runway distance bias, and aircraft distance to a selected runway; and a selector configured to make the lesser of the groundspeed safety margin value and distance-from-runway safety margin value the second vertical safety margin value.

9. The system of claim 8, wherein the altitude component is further configured to generate a geometric altitude vertical error value that is based on barometric altitude and a positioning system value.

10. The system of claim 8, further comprising a terrain floor generator configured to generate a terrain floor height value based on aircraft groundspeed, a predefined hover speed and approach speed, and a runway distance based terrain floor height value, wherein the alert component is further configured to determine if an alert condition exists based on the generated terrain floor height value.

11. A terrain avoidance system in an aircraft comprising:

a means for generating a geometric altitude vertical error value;

a means for generating a vertical safety margin value based on the generated vertical error value and safety margin limits;

a means for determining if an alert condition exists based on the generated vertical safety margin; and a means for generating a terrain floor height value based on a aircraft groundspeed, a predefined hover speed and approach speed, and a runway distance based terrain floor height value, wherein the means for determining further determines if an alert condition exists based on the generated terrain floor height value.

12. The system of claim 11, wherein the means for generating the altitude vertical error value generates a geometric altitude vertical error value that is based on barometric altitude and a positioning system value.

13. The system of claim 11, further comprising a means for generating a terrain floor height value based on a aircraft groundspeed, a predefined hover speed and approach speed, and a runway distance based terrain floor height value, wherein the means for determining further determines if an alert condition exists based on the generated terrain floor height value.

14. A terrain avoidance system in an aircraft comprising:

a means for generating a altitude vertical error value;

a means for generating a first vertical safety margin value based on the generated vertical error value and safety margin limits;

a means for generating a second vertical safety margin value based on the first vertical safety margin value, aircraft groundspeed, and aircraft distance to a selected runway; and a means for determining if an alert condition exists based on the generated second vertical safety margin value, wherein the second vertical safety margin generator comprises:

a means for generating a groundspeed safety margin value based on the first safety margin value, aircraft speed, and predefined hover and approach speed;

a means for generating a distance-from-runway safety margin value based on the first safety margin value, a predefined runway distance bias, and aircraft distance to a selected runway; and a means for selecting the lesser of the groundspeed safety margin value and distance-from-runway safety margin value the second vertical safety margin value.

15. The system of claim 14, wherein the means for generating the altitude vertical error value generates a geometric altitude vertical error value that is based on barometric altitude and a positioning system value.

16. The system of claim 14, further comprising a means for generating a terrain floor height value based on aircraft groundspeed, a predefined hover speed and approach speed, and a runway distance based terrain floor height value, wherein the means for determining determines if an alert condition exists based on the generated terrain floor height value.

17. A computer program product comprising:

a altitude component configured to generate an altitude vertical error value;

a vertical safety margin generating component configured to generate a vertical safety margin value based on the generated vertical error value and safety margin limits; and an alert component configured to determine if an alert condition exists based on the generated vertical safety margin; and a terrain floor generating component configured to generate a terrain floor height value based on a aircraft groundspeed, a predefined hover speed and approach speed, and a runway distance based terrain floor height value, wherein the alert component is further configured to determine if an alert condition exists based on the generated terrain floor height value.

18. The product of claim 17, wherein the altitude component is further configured to generate a geometric altitude vertical error value that is based on barometric altitude and a positioning system value.

19. The product of claim 17, further comprising a terrain floor generating component configured to generate a terrain floor height value based on a aircraft groundspeed, a predefined hover speed and approach speed, and a runway distance based terrain floor height value, wherein the alert component is further configured to determine if an alert condition exists based on the generated terrain floor height value.

20. A computer program product comprising:

a altitude component configured to generate an altitude vertical error value;

a first vertical safety margin generating component configured to generate a first vertical safety margin value based on the generated vertical error value and safety margin limits;

a second vertical safety margin generating component configured to generate a second vertical safety margin value based on the first vertical safety margin value, aircraft groundspeed, and aircraft distance to a selected runway; and an alert component configured to determine if an alert condition exists based on the generated second vertical safety margin value, wherein the second vertical safety margin generating component comprises:

groundspeed-based generating component configured to generate a groundspeed safety margin value based on the first safety margin value, aircraft speed, and predefined hover and approach speed;

a distance-from-runway-based generating component configured to generate a distance-from-runway safety margin value based on the first safety margin value, a predefined runway distance bias, and aircraft distance to a selected runway; and a selector configured to make the lesser of the groundspeed safety margin value and distance-from-runway safety margin value the second vertical safety margin value.

21. The system of claim 20, wherein the altitude component is further configured to generate a geometric altitude vertical error value that is based on barometric altitude and a positioning system value.

22. The computer program product of claim 20, further comprising a terrain floor generating component configured to generate a terrain floor height value based on aircraft groundspeed, a predefined hover speed and approach speed, and a runway distance based terrain floor height value, wherein the alert component is further configured to determine if an alert condition exists based on the generated terrain floor height value.

* * * * *